United States Patent [19]

Stocks

[11] 4,083,412
[45] Apr. 11, 1978

[54] AGRICULTURAL SOIL-WORKING APPARATUS

[75] Inventor: Richard Alexander Stocks, Holbeach, England

[73] Assignee: P.B. Bettinson & Company Limited, United Kingdom

[21] Appl. No.: 667,143

[22] Filed: Mar. 15, 1976

[30] Foreign Application Priority Data

Mar. 20, 1975 United Kingdom ............... 11546/75

[51] Int. Cl.$^2$ ............................................. A01C 5/06
[52] U.S. Cl. ................................. 172/462; 267/153; 111/84; 172/573; 172/500; 172/624
[58] Field of Search ..................... 267/153, 63 R, 140, 267/141, 152; 172/462, 264, 265, 710, 705, 500, 657, 572, 624, 573, 668, 707; 111/85

[56] References Cited

U.S. PATENT DOCUMENTS

| 264,921 | 9/1882 | Bemis | 267/63 R |
|---|---|---|---|
| 1,156,376 | 10/1915 | Smith | 267/63 R |
| 1,671,764 | 5/1928 | Dickey | 267/63 R |
| 2,361,496 | 10/1944 | Pointer | 267/63 R |
| 3,570,605 | 3/1971 | Riki | 172/668 |
| 3,611,956 | 10/1971 | Moore | 172/462 |
| 3,845,730 | 11/1974 | Koronka | 172/705 |

FOREIGN PATENT DOCUMENTS 1,274,219   5/1972   United Kingdom ................ 172/462

Primary Examiner—Richard J. Johnson
Attorney, Agent, or Firm—Kenway & Jenney

[57] ABSTRACT

An agricultural seed-drill comprises a frame and pivotally mounted drag bar carrying a coulter disc. An ovoid rubber spring is located between the drag bar and a member, such as a moving beam or bell crank lever, associated with the frame to apply pressure to the coulter, or to enable the coulter to be raised so that the disc does not contact the soil. In order to relieve strain on the spring member when the coulter is raised, the said spring member and associated threaded studs, used to attach the spring member to the drag arm and the member associated with the frame, contain a continuous longitudinal axial passageway in which is located a cable the end portions of which extend through the studs and are terminated by nipples spaced apart from the end of the studs. By this means the weight of the drag arm is taken by the cable when the drag arm is in the raised position.

6 Claims, 3 Drawing Figures

AGRICULTURAL SOIL-WORKING APPARATUS

This invention relates to agricultural soil-working apparatus having spring-loading means for urging a soil-working member into the soil, in particular, an apparatus in which the soil-working member forms part of a drill.

Seed drills normally comprise a frame, ground wheels, a hopper or seed box, and a number of soil-working members, for example, knives or coulters, each of which opens a slot in the soil into which the seed is placed. The soil-working members are generally located on drag bars which are pivotally mounted on the frame and which can be lowered to engage soil or raised into an inoperative position. In order to force the soil-working members into the soil, some form of loading, for example, hydraulic loading is applied to each member through a coil spring. The spring ensures that the soil-working member follows the contour of the ground and that a uniform seeding depth is maintained.

In order to overcome certain disadvantages in the use of coil springs as the spring-loading means, it has been proposed in British Patent Specification No. 1,274,219 to replace the coil spring with a rubber spring and in particular such a spring in the form of a cone having a rounded apex and having its base bonded onto a metal back plate.

In practice, however, it has been found that a use of such a conical rubber spring is also attended by disadvantages. Thus, it has been found that if the conical rubber spring is made of a soft rubber in order to give adequate vertical movement of the drag arm then it is unable to exert the high pressure necessary for satisfactory drilling in certain conditions. On the other hand if the spring is made of a hard rubber which enables it to achieve the required high pressure, then it does not allow sufficient vertical movement of the drag arm with the result that when the apparatus is used over rough ground uneven seeding depth is obtained.

A further disadvantage is that additional means are required for raising the drag arm to lift the coulters into an inoperative position when no longer required.

We have now found that the first of these disadvantages can be ameliorated if the rubber spring is substantially ovid in shape, one apex being adapted to be mounted on the frame or an extension thereof, e.g. by a threaded metal stud bonded into the said apex, and the other apex preferably being adapted to be attached to the drag arm.

Accordingly, therefore, the present invention comprises an agricultural soil-working apparatus including a frame having pivotally mounted thereon a drag bar carrying a soil-working member, and a rubber spring means arranged to be capable of acting on the drag bar to urge the soil-working member into the soil, the spring being substantially ovoid in shape.

The requirement for an additional means for raising the drag arm can be avoided by locating a stud, preferably threaded, at each end of the longitudinal axis of the ovoid spring member. One stud is used to attach the spring member firmly to the drag arm and the other stud to attach the said member to the frame or a member associated therewith. In order to reduce the strain on the spring member when the drag arm is lifted to raise the coulters into the inoperative position, (in which condition the full weight of the drag arm is carried by the spring member) a hollow passage is formed along the longitudinal axis thereof and a length of cable or rod is inserted through the said passage. One end of the cable or rod may be welded onto one of the studs, and the other end passed through the opposite stud (which thereby has to be hollow) and terminated by a nipple a short distance apart from the head of the stud. When the drag arm is then lifted, its weight is taken by the cable or rod passing through the centre of the spring member. If desired both studs may be hollow and the cable or rod terminated at both ends by nipples spaced apart from the outer end portions of the studs.

As indicated above, one end of the spring member may be attached directly to the frame, the other end preferably being attached to the drag arm which may be raised into an inoperative position through movement of the frame relative to the ground level.

In another arrangement one end of the spring member may be attached to the drag arm and the other end attached to a moving beam mounted on the frame member via a hydraulic piston and cylinder arrangement which, in combination with the spring means, is capable of raising the drag arm to bring the coulters into an inoperative position.

In yet a further arrangement one end of the spring member is attached to the drag arm and the other end mounted on one arm of a lever, preferably a bell crank lever, pivotally mounted on a bracket attached to the frame member. Pressure may be applied to the other lever arm by means of a hydraulic piston and cylinder arrangement which may also act on the bell crank lever so as to raise the drag arm and bring the coulters into an inoperative position.

One embodiment of the present invention will now be described in greater detail by reference to the accompanying drawings.

Figure 1:
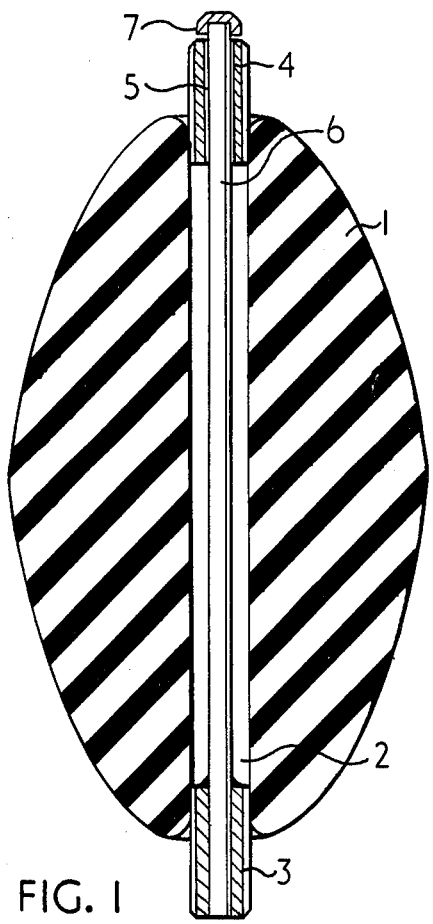
FIG. 1 is a schemmatic cross-sectional representation of the spring means according to the present invention, and, FIG. 2 is a schemmatic side view of a seed drill in which the rubber spring is fixed between a moving beam and the drag arm.

Referring to FIG. 1, the ovoid rubber spring member 1 contains a hollow passageway 2 extending along its longitudinal axis, screw-threaded stud members 3 and 4 are bonded into the ends of the hollow passageway, member 4 having a hollow passageway 5 extending therethrough. A cable 6 is welded at one end onto stud 3, the other end passing through stud 4 and being terminated by a nipple 7 of sufficient size not to pass through the hollow passageway 5 in stud 4 when under strain.

Figure 2:
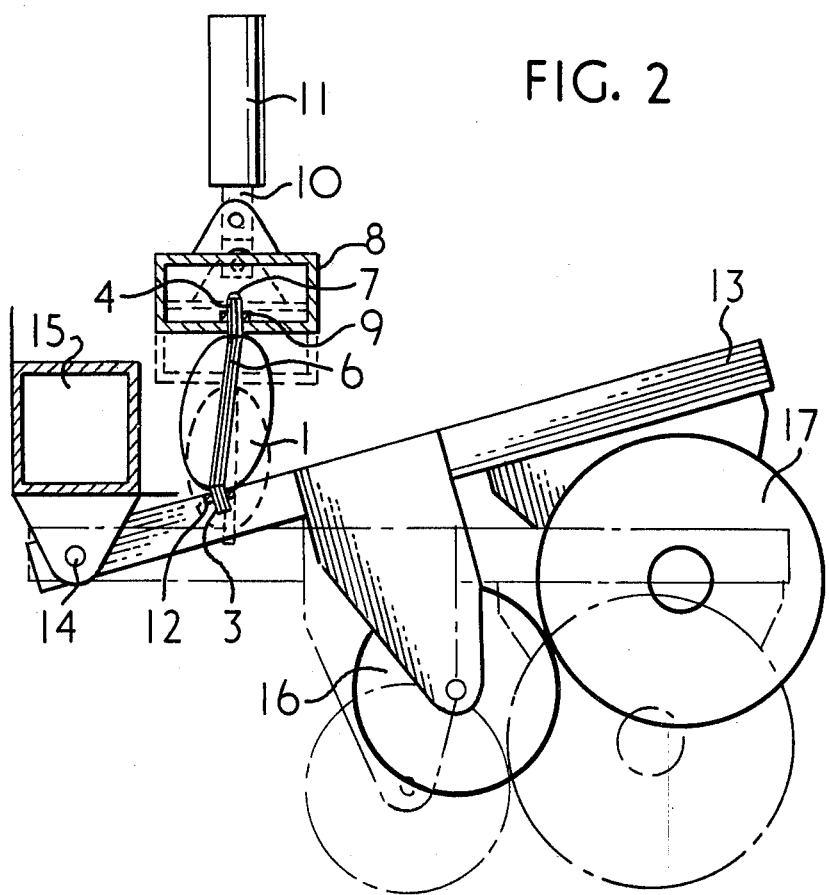

As shown in FIG. 2, the spring member 1 is fixed at one end onto a moving beam 8 through screw-threaded stud 4 and associated nut 9. Beam member 8 is itself located on a rod 10 which is part of a piston and cylinder arrangement 11 attached to a frame member (not shown). The other end of the rubber spring member 1 is attached onto a channel section drag arm 13 by stud 3 and associated nut 12. One end of the drag arm 13 is pivoted about point 14 on frame member 15. The drag arm carries a single disc 16 and a twin disc 17 through which seed is dispensed into the drill via a hopper and conduit means (not shown). The drawing shows a drag arm in the raised, inoperative position, the weight of the drag arm being taken by the cable 6 thereby causing only minimal extension to the rubber spring member.

The dotted outline indicates the position of the drag arm and associated members in the operative drilling position.

Figure 3:
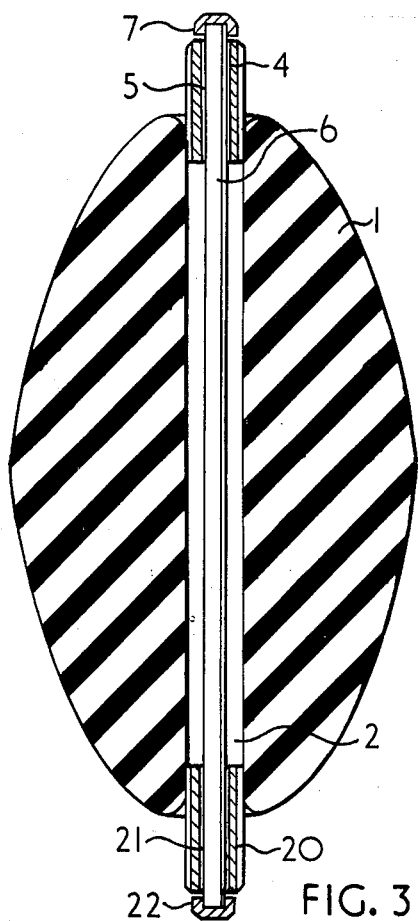
FIG. 3 is a schemmatic cross-sectional representation of an alternative form of spring means.

In one alternative form of spring member, illustrated in FIG. 3, which may be used in the seed drill of FIG. 2, the threaded stud 3 of FIG. 1 is replaced by a threaded stud 20 having a hollow passageway 21. Cable 6 passes through the passageway 21 and is terminated by a nipple 22 spaced a short distance apart from the outer end of the stud 20.

In use, a plurality of drag arms are mounted parallel on the frame and each associated spring attached to a single moving beam. The drag arms are lowered into the operative position and the amount of loading on the arms adjusted by the position to which the moving beam 8 is moved by the piston and cylinder arrangement 11 to allow for the type of soil to be worked. Because of the increased flexibility of the spring member compared with the conical member previously referred to, the seed drill may be used successfully over rough ground to give a uniform seeding depth.

I claim:

1. An agricultural soil-working apparatus comprising a frame, drag bar and soil-working member, said drag bar being pivotally mounted on the frame and carrying said soil-working member, rubber spring means mounted to act on said drag bar to urge the soil-working member into the soil, said rubber spring means being substantially ovoid in shape, having rounded apices, and being free to expand laterally during said urging, and first and second studs mounted at each end of the longitudinal axis of said ovoid spring member, one said stud being attached to the drag arm and the other said stud being attached to a member associated with said frame, said ovoid spring member and said first stud including a hollow longitudinal axial passageway therethrough and a cable member having two end portions located therein, one end portion of said cable extending through the hollow passageway in said first stud and being terminated by a nipple spaced apart from said stud and the other end portion of said cable being attached to the second said stud.

2. Apparatus according to claim 1 and wherein said member associated with the frame is a moving beam, said moving beam being located on the free end of a piston in a piston and cylinder arrangement located on said frame.

3. Apparatus according to claim 1 and wherein said member associated with said frame comprises a lever having two arms and pivotally located on a bracket attached to said frame, said ovoid spring member being attached to one said arm and a piston and cylinder arrangement being located on said frame and acting on said other arm to cause said drag arm to be raised or to apply pressure thereto through said ovoid spring member.

4. Apparatus according to claim 1 wherein said second stud includes a hollow longitudinal axial passageway therethrough, the other end portion of said cable extends through the passageway in said second stud and is terminated by a nipple spaced apart from said second stud.

5. Apparatus according to claim 4 and wherein said member associated with the frame is a moving beam, said moving beam being located on the free end of a piston in a piston and cylinder arrangement located on said frame.

6. Apparatus according to claim 4 and wherein said member associated with said frame comprises a lever having two arms and pivotally located on a bracket attached to said frame, said ovoid spring member being attached to one said arm and a piston and cylinder arrangement being located on said frame and acting on said other arm to cause said drag arm to be raised or to apply pressure thereto through said ovoid spring member.

* * * * *